US011898524B1

(12) United States Patent
Gerstner et al.

(10) Patent No.: US 11,898,524 B1
(45) Date of Patent: Feb. 13, 2024

(54) BIDIRECTIONAL PURGING FUEL FROM A FUEL DELIVERY SYSTEM

(71) Applicant: Caterpillar Inc., Peoria, IL (US)

(72) Inventors: Michael David Gerstner, Peoria, IL (US); Daniel Raymond Baldwin, Mossville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/345,625

(22) Filed: Jun. 30, 2023

(51) Int. Cl.
*F02M 37/54* (2019.01)

(52) U.S. Cl.
CPC .................................. *F02M 37/54* (2019.01)

(58) Field of Classification Search
CPC ............... F02M 37/54; F02M 37/0076; F02M 37/0088; F02M 37/08
See application file for complete search history.

(56) References Cited

U.S. PATENT DOCUMENTS

| | | | | |
|---|---|---|---|---|
| 4,157,082 | A | 6/1979 | Day | |
| 6,960,401 | B2 | 11/2005 | Barton et al. | |
| 9,381,453 | B2 | 7/2016 | Ayers et al. | |
| 10,188,979 | B2 | 1/2019 | Williams et al. | |
| 11,077,393 | B2 | 8/2021 | Pokharkar et al. | |
| 11,352,248 | B2 | 6/2022 | Schultz et al. | |
| 2011/0030658 | A1* | 2/2011 | Ulrey | F02M 25/089 123/521 |
| 2013/0319378 | A1* | 12/2013 | Haag | F02M 25/089 73/40.5 R |
| 2016/0108864 | A1* | 4/2016 | Tochihara | F02M 25/0809 123/519 |
| 2020/0063697 | A1* | 2/2020 | Maclennan | F02M 59/20 |

FOREIGN PATENT DOCUMENTS

| | | | |
|---|---|---|---|
| CN | 203752891 | U | 8/2014 |
| FR | 2830284 | A1 | 4/2003 |
| WO | WO2015031970 | A1 | 3/2015 |

* cited by examiner

*Primary Examiner* — Grant Moubry
(74) *Attorney, Agent, or Firm* — Lee & Hayes, P.C.

(57) ABSTRACT

A fuel delivery system for an internal combustion engine system is described herein. The fuel delivery system uses one or more bidirectional purge components to provide for bidirectional purging of a fuel from at least a portion of the fuel delivery system. The bidirectional purge components provide for a fuel delivered using the fuel delivery system to be purged into the directional purge component in more than one fluid flow direction. When a differential pressure is applied across the bidirectional purge component, the fuel is purged into an inlet and an outlet of the bidirectional purge component, leaving the component through a purge outlet and into a tank. The differential pressure can be generated using a pressured fluid such as nitrogen or a pump downstream of the purge outlet.

20 Claims, 5 Drawing Sheets

BIDIRECTIONAL PURGING FUEL FROM A FUEL DELIVERY SYSTEM

TECHNICAL FIELD

The present disclosure relates to internal combustion engines, and more particularly, to bidirectional purging of a fuel.

BACKGROUND

Internal combustion engines are widely used in various industries. Internal combustion engines can operate on a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. In an attempt to reduce greenhouse gases (GHG), some endeavors have been made to change the primary fuel used in combustions engines from fuels such as diesel to alcohol fuels such as ethanol and methanol, or combinations of these fuels. However, the use of fuels such as ethanol and methanol can cause some issues. For example, it may be preferable or required to purge at least a portion of the fuel from one or more parts of a combustion engine when the combustion engine is shutdown.

Some efforts have been made to purge a fuel from engine components. For example, French Patent Application FR2830284A1 to Schachtrup et al. ("the '284 application"') describes one such effort. The '284 application is directed to a fuel filter used for an internal combustion engine. The fuel filter has an inlet on one side and an outlet on a second side. (Abstract). The fuel filter of the '284 application further includes a vent valve to vent air from the filter and a purge valve to purge air from the system. When pressurized fuel is received into the filter, the purge valve is opened to purge air from the system. However, the system (and process) described in the '284 application suffers from some shortfalls. For example, the system of the '284 application purges in only one direction, meaning air downstream of the filter would not be purged. Thus, issues with undesirable fluids being in the fluid stream may remain even after the use of the purge valve.

Some examples of the present disclosure are directed to overcoming these and other deficiencies of such systems.

SUMMARY

In an aspect of the presently disclosed subject matter, a fuel delivery system includes a fuel pump fluidly connected to a fuel tank, the fuel pump configured to direct a fuel from the fuel tank to be used by an internal combustion engine, a bidirectional purge component fluidly connected to the fuel pump, the bidirectional purge component comprising an inlet configured to receive the fuel from the fuel pump, an outlet configured to direct the fuel out of the bidirectional purge component to the internal combustion engine during a fuel delivery operation, and receive the fuel into the bidirectional purge component during a purge operation, and a purge outlet fluidically connected to a tank, the purge outlet configured to direct the fuel entering the inlet or outlet during the purge operation to the tank, and a pressure regulator fluidically connected to the outlet of the bidirectional purge component, the pressure regulator configured to maintain a pressure of the fuel below a predetermined pressure, and a differential pressure source fluidically connected to the bidirectional purge component, the differential pressure source providing a differential pressure across the bidirectional purge component to cause the fuel to move into the inlet of the bidirectional purge component or the outlet of the bidirectional purge component during the purge operation.

In an additional aspect of the presently disclosed subject matter, a controller for controlling a purge operation of a fuel delivery system includes a memory storing computer-executable instructions, and a processor in communication with the memory, the computer-executable instructions causing the processor to perform acts comprising receiving a purge event notice to purge a fuel from at least a portion of a fuel delivery system of an internal combustion engine, establishing a purge configuration to commence a bidirectional purge operation of the fuel through a bidirectional purge component, wherein the bidirectional purge component comprises an inlet configured to receive the fuel from a fuel pump, and an outlet configured to direct the fuel out of the bidirectional purge component to the internal combustion engine during a fuel delivery operation, and receive the fuel into the bidirectional purge component during a purge operation, and a purge outlet fluidically connected to a tank, the purge outlet configured to direct the fuel entering the inlet or entering the outlet during the purge operation to the tank; and terminating the purge operation.

In a still further aspect of the presently disclosed subject matter, a method of bidirectional purging includes receiving a purge event notice to purge a fuel from at least a portion of a fuel delivery system of an internal combustion engine, establishing a purge configuration to commence a bidirectional purge operation of the fuel through a bidirectional purge component, wherein the bidirectional purge component comprises an inlet configured to receive the fuel from a fuel pump, and an outlet configured to direct the fuel out of the bidirectional purge component to the internal combustion engine during a fuel delivery operation, and receive the fuel into the bidirectional purge component during a purge operation, and a purge outlet fluidically connected to a tank, the purge outlet configured to direct the fuel entering the inlet or entering the outlet during the purge operation to the tank, and terminating the purge operation.

DETAILED DESCRIPTION

Figure 1:
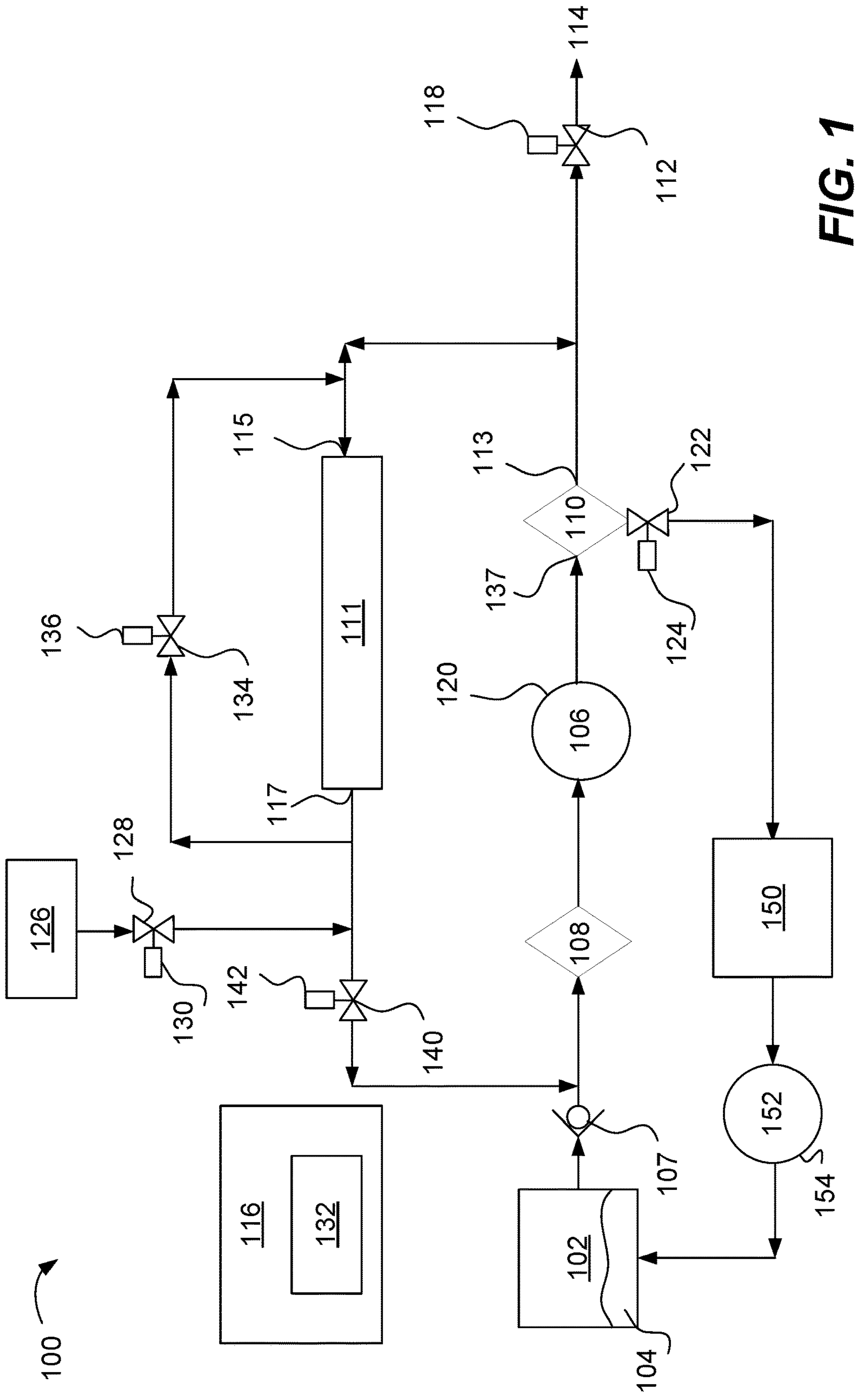
FIG. 1 illustrates a fuel delivery system that uses a pressurized fluid to provide a differential pressure to purge a fuel, in accordance with various embodiments of the presently disclosed subject matter.

Wherever possible, the same reference numbers will be used throughout the drawings to refer to the same or like parts. FIG. 1 illustrates a fuel delivery system 100 capable of bidirectional purging, in accordance with various embodiments of the presently disclosed subject matter. The fuel delivery system 100 includes a fuel tank 102 that is used to store and provide a fuel 104 to an internal combustion engine (not shown). The fuel 104 might include a gasoline, diesel distillate fuel, dimethyl ether, biodiesel, Hydrotreated Vegetable Oil (HVO), Gas to Liquid (GTL) renewable diesel, any of a variety of liquid fuels with a cetane enhancer, or still another fuel type. The fuel 104 may also include an alcohol fuel such as methanol or ethanol, Naphtha, for example, or still other fuel types.

The fuel delivery system 100 further includes a fuel pump 106. The fuel pump 106 is in fluidic communication with the fuel tank 102 and is configured to pump the fuel 104 from the fuel tank 102, through a check valve 107, through a screen filter 108 and a fuel filter 110, through a fuel shutoff valve 112 for delivery as a fuel output 114 to an engine (not shown). The screen filter 108 can be any variety of filter designed to block at least a portion of particulate contained within the fuel 104 from entering the fuel pump 106. The screen filter 108 can be, but is not limited to, a wire mesh filter. Generally, these types of filters are designed to block relatively larger particulate than what may be filtered out using the fuel filter 110. The particulate can be particles found in the fuel tank 102 that may be introduced into the fuel 104 when the fuel 104 is delivered into the fuel tank 102 or from corrosion of components of the fuel tank 102 itself. The fuel filter 110, in some examples, is designed to filter or block smaller particulate that may not be blocked by the screen filter 108. The fuel filter 110 can be various types of filters, but in some examples, is a cellulose-based filter wherein the cellulose is semi-permeable allowing filtered fuel to pass through the fuel filter 110 while blocking (or entraining) particulate. The fuel delivery system 100 further includes a regulator 111. The regulator 111 is used to reduce the probability of an overpressure situation or relieve pressure on an outlet 113 of the fuel filter 110. At a predetermined pressure at an inlet 115 of the regulator 111, the regulator 111 opens, allowing the fuel 104 to move from the inlet 115 to an outlet 117, relieving pressure.

The fuel delivery system 100 further includes a controller 116. The controller 116 can be a component of an engine control unit (ECU), engine control module (ECM) ECU of an internal combustion engine, or another component used to control various aspects of an internal combustion engine. The controller 116 controls the amount of the fuel 104 entering an internal combustion engine. The controller 116 includes one or more processors and memory storing therein instructions that, when executed by the processor of the controller 116, cause the controller 116 to control the amount and timing of the fuel 104 entering the internal combustion engine. Additionally, the controller 116 includes one or more transceivers or input/output devices used to send control signals to various components of the fuel delivery system. For example, the controller 116 transmits a fuel shutoff signal 118 to an actuator (not shown) of the fuel shutoff valve 112 to either allow or restrict the flow of the fuel 104 through the fuel output 114 and into the internal combustion engine. The controller 116 also transmits a pump control signal 120 to the fuel pump 106 to start, stop, or adjust the speed of the fuel pump 106 if the fuel pump 106 is a variable speed pump. These and other aspects of the controller 116 are explained in more detail in FIG. 5, below.

As noted above, in some examples, it may be desirable to purge at least a portion of the fuel 104 from the fuel delivery system 100. To accomplish a purge operation, the fuel delivery system 100 uses bidirectional purge. As used herein, a "bidirectional purge" means that the fuel 104 to be purged is directed into at least one component of the fuel delivery system 100 in two directions, one direction following the normal flow path the fuel 104 takes through the component and at least another direction opposite to the normal flow path the fuel 104 takes through the component. For example, in FIG. 1, the bidirectional purge component used is the fuel filter 110. The fuel filter 110 includes a purge valve 122 controlled by a purge signal 124 issued by the controller 116. The purge signal 124 is used to open and close the purge valve 122. When the purge valve 122 is opened, a purge tank 150 is placed in fluidic communication with the fuel filter 110, allowing the fuel 104 that is purged to travel through the purge valve 122 and into the purge tank 150. It should be noted that the use of the fuel filter 110 as the bidirectional purge component is merely used as an example, as one or more of the components of the fuel delivery system may be similarly configured and used as one of the bidirectional purge components. In some examples, the fuel 104 in the purge tank 150 can be pumped into the fuel tank 102 to be reused. In those examples, a purge tank pump 152 is used. The controller 116 can issue purge tank pump signal 154 to turn on the purge tank pump 152 to pump the fuel 104 in the purge tank 150 into the fuel tank 102.

Although in some examples opening the purge valve 122 allows for a purging operating through gravity draining, in further examples, a pressure differential across the bidirectional purge component is used to force the fuel 104 through the fuel filter 110 in more than one direction. The example in FIG. 1 uses a pressurized fluid source to provide a differential pressure across the fuel filter 110. In FIG. 1, the differential pressure source is pressurized nitrogen 126. The nitrogen 126 provides the force to move the fuel 104 through the fuel filter 110 and into the fuel tank 102. The nitrogen 126 is introduced into the fuel delivery system 100 through a purge fluid valve 128. The controller 116 issues a purge signal 130 to open the purge fluid valve 128. When the controller 116 receives a purge event notice 132 from one or more systems of the engine to which the fuel 104 is delivered, the controller 116 issues the pump control signal 120 to the fuel pump 106 to turn off the fuel pump 106, thereby reducing or stopping the uptake of the fuel 104 from the fuel tank 102 by the fuel pump 106. The controller 116 further issues the fuel shutoff signal 118 to the fuel shutoff valve 112 to restrict the flow of the fuel 104 to the engine. Further, the controller 116 issues the purge signal 130 to open the purge fluid valve 128, thus fluidically connecting the nitrogen 126 with the fuel delivery system 100, and the purge signal 124 to open the purge valve 122, thus allowing the fuel 104 to flow into the fuel tank 102 from the fuel filter 110. In this first purge configuration, the pressure of the nitrogen 126 purges the fuel 104 through the screen filter 108, the fuel pump 106, the fuel filter 110 and out through the purge valve 122 and into the fuel tank 102. A portion of the fuel 104, in this configuration, may also be purged directly into the fuel tank 102. As illustrated in FIG. 1, the fuel 104, when purging, flows through the fuel filter 110 in the direction that the fuel 104 normally flows through the fuel delivery system 100. However, to purge the fuel 104 that is on the outlet side of the fuel filter 110 between the fuel filter 110 and the fuel shutoff valve 112, the fuel delivery system 100 further includes a bypass valve 134.

The bypass valve 134 is opened and shut by the controller 116 using a bypass signal 136. The bypass valve 134 is used to provide the pressure from the nitrogen 126 to the outlet 113 of the fuel filter 110 to allow the fuel 104 to be purged through both an inlet 137 of the fuel filter 110 and the outlet 113 of the fuel filter 110, providing for bidirectional purging. When the bypass valve 134 is opened, providing a second purge configuration, the pressurized nitrogen 126 purges the fuel 104 by bypassing the regulator 111. The fuel 104 further flows through the bypass valve 134 and into the outlet 113 of the fuel filter 110. When the purge valve 122 is open, the purged fuel flows into the outlet 113 of the fuel filter 110, through the purge valve 122 and into the fuel tank 102. With the bypass valve 134 open, the first purge configuration, described above whereby the fuel 104 flows into the fuel filter 110 through the inlet 137, is commencing with the second purge configuration, whereby the fuel 104 flows into the fuel filter 110 through the outlet 113 of the fuel filter 110, thereby providing bidirectional purging.

In some examples, it may be desirable to conduct a bidirectional purging operation where the first configuration is used in a different time than the second configuration, providing a third configuration. The third configuration allows the fuel delivery system 100 to purge different portions of the fuel delivery system 100 at different times. To provide for time-dependent bidirectional purging (the third configuration), the fuel delivery system 100 further includes a purge cutoff valve 140 that is opened and closed by the controller 116 using a purge cutoff signal 142. When closed, the pressurized nitrogen 126 is prevented from purging the fuel 104 in the first configuration because the pressure from the nitrogen 126 is fluidically disconnected from the inlet 137 of the fuel filter 110. In this example, the first configuration may be established to purge the fuel 104 into the inlet 137 of the fuel filter 110 by closing the bypass valve 134. The second configuration may be established by closing the purge cutoff valve 140 and opening the bypass valve 134. The fuel delivery system 100 may switch between the first configuration, the second configuration, and the third configuration at different times to provide different manners of purging.

The example of FIG. 1 uses the pressure of the nitrogen 126 to purge the fuel 104 from various parts of the fuel delivery system 100. The nitrogen 126, or other purge fluid, pressurizes the fuel delivery system 100, forcing the fuel 104 out through the fuel filter 110. However, in some examples, pressuring the fuel delivery system 100 may not be desirable or possible. For example, some systems may not have a pressurized fluid, like the nitrogen 126, available to provide the pressure to purge. In another example, the fuel delivery system may be used to deliver a fuel that is preferably used a lower pressure system, whereby applying a pressure may damage components or otherwise be a safety hazard. In this manner, the bidirectional purging may be accomplished using a purge pump to provide the differential pressure rather than a pressurized fluid, an example of which is described in FIG. 2.

Figure 2:
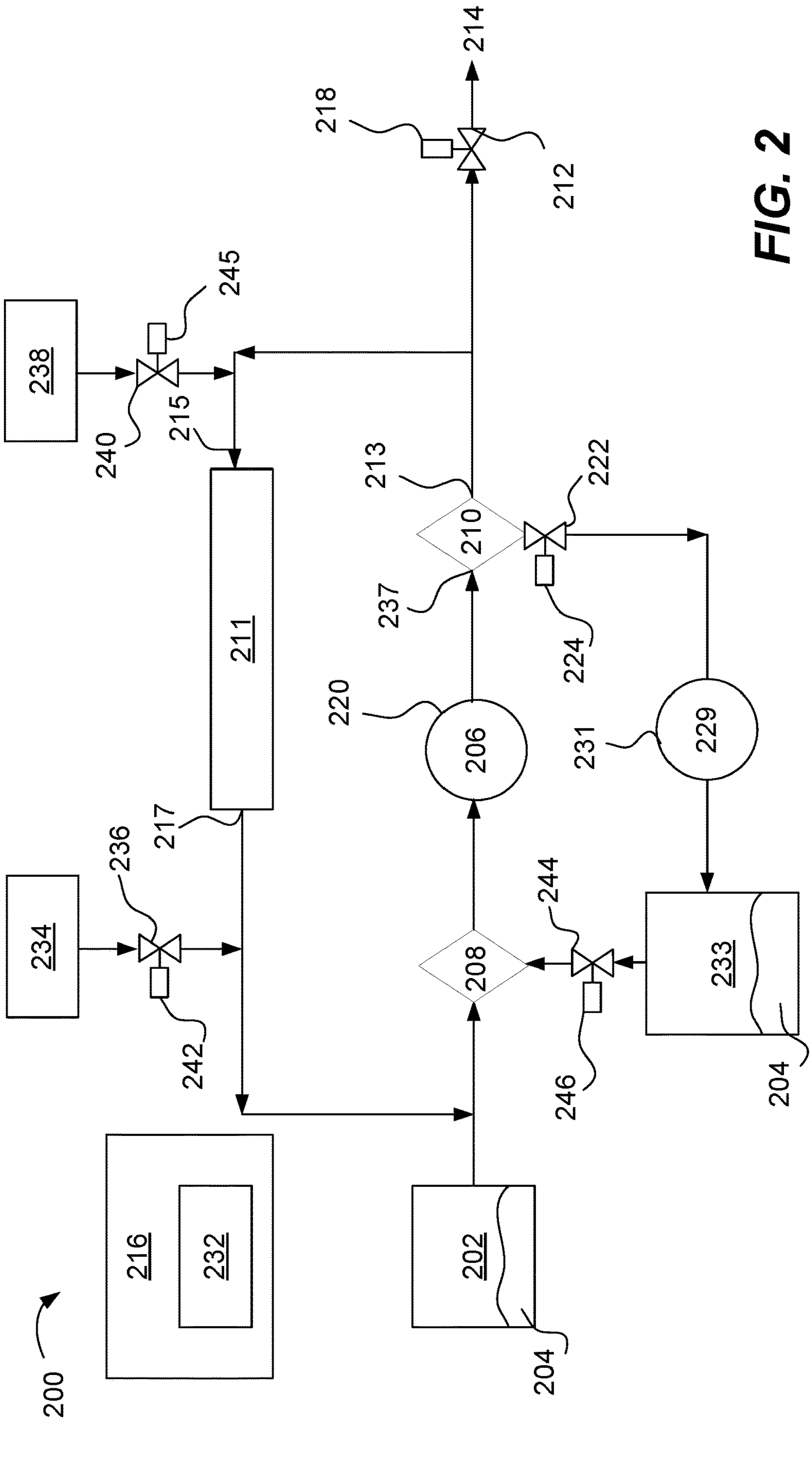
FIG. 2 illustrates a fuel delivery system that uses a pump to provide a differential pressure to purge a fuel, in accordance with various embodiments of the presently disclosed subject matter.

FIG. 2 illustrates a fuel delivery system 200 that uses a pump to provide a differential pressure to purge fuel, in accordance with various embodiments of the presently disclosed subject matter. The fuel delivery system 200 includes a fuel tank 202 that is used to store and provide a fuel 204 to an internal combustion engine (not shown). The fuel delivery system further includes a fuel pump 206. The fuel pump 206 is in fluidic communication with the fuel tank 202 and is configured to pump the fuel 204 from the fuel tank 202 through a screen filter 208 and a fuel filter 210, through a fuel shutoff valve 212 for delivery as a fuel output 214 to an engine. The fuel delivery system 200 further includes a regulator 211. The regulator 211 is used to reduce the probability of an overpressure situation or relieve pressure on an outlet 213 of the fuel filter 210. At a predetermined pressure at an inlet 215 of the regulator 211, the regulator 211 opens, allowing the fuel 204 to move from the inlet 215 to an outlet 217, relieving pressure.

The fuel delivery system 200 further includes a controller 216. The controller 216 can be a component of an engine control unit (ECU) or engine control module (ECM) ECU of the internal combustion engine. The controller 216 controls the amount of the fuel 204 entering the internal combustion engine. The controller 216 includes one or more processors and memory storing therein instructions that, when executed by the processor of the controller 216, cause the controller 216 to control the amount and timing of the fuel 204 entering the internal combustion engine. Additionally, the controller 216 includes one or more transceivers or input/output devices used to send control signals to various components of the fuel delivery system. For example, the controller 216 transmits a fuel shutoff signal 218 to an actuator (not shown) of the fuel shutoff valve 212 to either allow or restrict the flow of the fuel 204 through the fuel output 214 and into the internal combustion engine. The controller 216 also transmits a pump control signal 220 to the fuel pump 206 to start, stop, or adjust the speed of the fuel pump 206 if the fuel pump 206 is a variable speed pump.

As noted above, in some examples, it may be desirable to purge at least a portion of the fuel 204 from the fuel delivery system 200. To accomplish a purge operation, the fuel delivery system 200 uses purge pump 229 as the differential pressure source to provide for a bidirectional purge. The controller 216 issues purge pump signal 231 to turn on, off, or change the speed of the purge pump 229. The purge pump 229 is in fluidic communication with a purge valve 222 of the fuel filter 210 and provides a pressure differential across the fuel filter 210 to purge the fuel 204. The purge valve 222 is controlled by a purge signal 224 issued by the controller 216. The purge signal 224 is used to open and close the purge valve 222. When the purge valve 222 is opened, a fuel tank 233 is placed in fluidic communication with the fuel filter 210, allowing the fuel 204 that is purged to travel through the purge valve 222 and into the fuel tank 233. It should be noted that the use of the fuel filter 210 as the bidirectional purge component is merely used as an example, as one or more of the components of the fuel delivery system may be similarly configured and used as one of the bidirectional purge components. The fuel 204 that is purged into the fuel tank 233 may be used again by the fuel delivery system 200 by opening tank valve 244 using a tank valve signal 246 issued by the controller 216.

When the controller 216 receives a purge event notice 232 from one or more systems of the engine to which the fuel 204 is delivered, the controller 216 issues the pump control signal 220 to the fuel pump 206 to turn off the fuel pump 206, thereby reducing or stopping the uptake of the fuel 204 from the fuel tank 202 by the fuel pump 206. The controller 216 further issues the fuel shutoff signal 218 to the fuel shutoff valve 212 to restrict the flow of the fuel 204 to the engine. Further, the controller 216 issues the purge pump signal 231 to turn on the purge pump 229, and the purge signal 224 to open the purge valve 222, thus allowing the fuel 204 to flow into the fuel tank 233 from the fuel filter 210. In this first purge configuration, the reduced pressure provided by the purge pump 229 pulls the fuel 204 through the fuel filter 210. The purge pump 229 provides a reduced pressure to purge the fuel 204 through the screen filter 208, the fuel pump 206, the fuel filter 210 and out through the purge valve 222 and into the fuel tank 233.

As the purge pump 229 purges the fuel 204, nitrogen 234 and/or nitrogen 238, which are pressurized nitrogen sources in some examples, are provided to backfill the fuel 204 that is being purged and, in some examples, provide a nitrogen blanket. In some examples, the purge pump 229 pulling the fuel 204 can create a vacuum. To reduce the probability of creating a vacuum, provide a nitrogen blanket in areas purged of the fuel 204, and/or to assist the purge pump 229, in some examples, the nitrogen 234 and/or nitrogen 238 provide a pressure to assist in the purge operation. The nitrogen 234 is introduced into the fuel delivery system 200 through a purge fluid valve 236 and the nitrogen 238 is introduced into the fuel delivery system 200 through a purge fluid valve 240. The controller 216 issues a purge signal 242 to open the purge fluid valve 236 and a purge signal 245 to open the purge fluid valve 240 when the purge pump 229 is activated, thus fluidically connecting the nitrogen 234 and/or nitrogen 238 to the fuel delivery system 200.

As illustrated in FIG. 2, the fuel 204, when purging, flows into an inlet 237 of the fuel filter 210 in the direction that the fuel 204 normally flows through the fuel delivery system 200. Further, the purge pump 229 pulls fuel 204 from the side of the outlet 213 of the fuel filter 210, whereby the fuel 204 flows into the fuel filter 210 in a direction opposite that the fuel 204 normally flows through the fuel delivery system 200, providing for a bidirectional purging operation. The examples of FIGS. 1 and 2 illustrate the use of a component of the fuel delivery systems 100 and 200, such as the fuel filter, through which the fuel is purged. However, as mentioned above, more than one component may be used as the bidirectional purge component described in more detail in FIG. 3.

Figure 3:
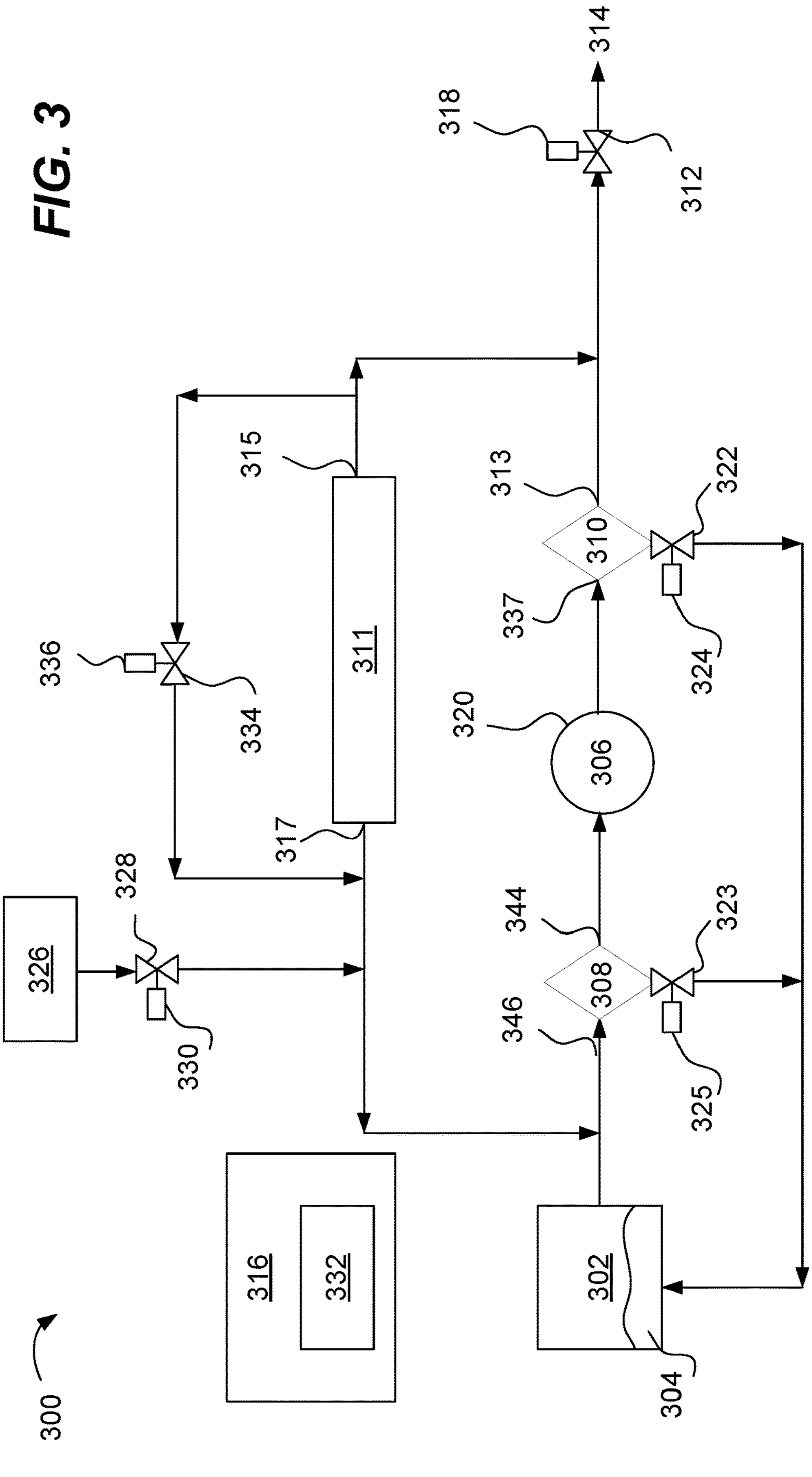
FIG. 3 illustrates a fuel delivery system having more than one bidirectional purge component, in accordance with various examples of the presently disclosed subject matter.

FIG. 3 illustrates a fuel delivery system 300 having more than one bidirectional purge component, in accordance with various embodiments of the presently disclosed subject matter. The fuel delivery system 300 includes a fuel tank 302 that is used to store and provide a fuel 304 to an internal combustion engine (not shown). The fuel delivery system further includes a fuel pump 306. The fuel pump 306 is in fluidic communication with the fuel tank 302 and is configured to pump the fuel 304 from the fuel tank 302 through a screen filter 308 and a fuel filter 310, through a fuel shutoff valve 312 for delivery as a fuel output 314 to an engine. The fuel delivery system 300 further includes a regulator 311. The regulator 311 is used to reduce the probability of an overpressure situation or relieve pressure on an outlet 313 of the fuel filter 310. At a predetermined pressure at an inlet 315 of the regulator 311, the regulator 311 opens, allowing the fuel 304 to move from the inlet 315 to an outlet 317, relieving pressure.

The fuel delivery system 300 further includes a controller 316. The controller 316 can be a component of an engine control unit (ECU) or engine control module (ECM) ECU of the internal combustion engine. The controller 316 controls the amount of the fuel 304 entering the internal combustion engine. The controller 316 includes one or more processors and memory storing therein instructions that, when executed by the processor of the controller 316, cause the controller 316 to control the amount and timing of the fuel 304 entering the internal combustion engine. Additionally, the controller 316 includes one or more transceivers or input/output devices used to send control signals to various components of the fuel delivery system. For example, the controller 316 transmits a fuel shutoff signal 318 to an actuator (not shown) of the fuel shutoff valve 312 to either allow or restrict the flow of the fuel 304 through the fuel output 314 and into the internal combustion engine. The controller 316 also transmits a pump control signal 320 to the fuel pump 306 to start, stop, or adjust the speed of the fuel pump 306 if the fuel pump 306 is a variable speed pump.

As noted above, in some examples, it may be desirable to purge at least a portion of the fuel 304 from the fuel delivery system 300. To accomplish a purge operation, the fuel delivery system 300 uses bidirectional purge. In FIG. 3, the bidirectional purge components used are the fuel filter 310 and the screen filter 308. The fuel filter 310 includes a purge valve 322 controlled by a purge signal 324 issued by the controller 316. The purge signal 324 is used to open and close the purge valve 322. Similarly, the screen filter 308 includes a purge valve 322 controlled by a purge signal 325 issued by the controller 316. The purge signal 325 is used to open and close the purge valve 322. When the purge valve 322 or the purge valve 322 are opened, the fuel tank 302 is placed in fluidic communication with the fuel filter 310 or the screen filter 308 (depending on which one is open, or both if both are open), allowing the fuel 304 that is purged to travel through the purge valve 322 or the screen valve 323 and into the fuel tank 302. It should be noted that the use of the fuel filter 110 or the screen valve 323 as the bidirectional purge components is merely used as an example, as one or more of the components of the fuel delivery system may be similarly configured and used as one of the bidirectional purge components.

Although in some examples opening the purge valve 322 or the screen valve 323 allows for a purging operating through gravity draining, in further examples, a pressure differential across the bidirectional purge component is used to force the fuel 304 through the fuel filter 310 or the screen filter 308 in more than one direction. The example in FIG. 3 uses a pressurized fluid source, in this example, nitrogen 326, to provide the force to move the fuel 304 through the fuel filter 310 or the screen filter 308 and into the fuel tank 302. The nitrogen 326 is introduced into the fuel delivery system 300 through a purge fluid valve 328. The controller 316 issues a purge signal 330 to open and close the purge fluid valve 328. When the controller 316 receives a purge event notice 332 from one or more systems of the engine to which the fuel 304 is delivered, the controller 316 issues the pump control signal 320 to the fuel pump 306 to turn off the fuel pump 306, thereby reducing or stopping the uptake of the fuel 304 from the fuel tank 302 by the fuel pump 306. The controller 316 further issues the fuel shutoff signal 318 to the fuel shutoff valve 312 to restrict the flow of the fuel 304 to the engine. Further, the controller 316 issues the purge signal 330 to open the purge fluid valve 328, thus fluidically connecting the nitrogen 326 with the fuel delivery system 300. The controller 316 further issues the purge signal 324 to open the purge valve 322 and/or the purge signal 325 to open the purge valve 322, thus allowing the fuel 304 to flow into the fuel tank 302 from the fuel filter 310 and/or the screen filter 308. In this first purge configuration, the pressure of the nitrogen 326 purges the fuel 304 through the screen filter 308, the pump 306, the fuel filter 310 and out through the purge valve 322 and/or the purge valve 322 and into the fuel tank 302. A portion of the fuel 304, in this configuration, may also be purged directly into the fuel tank 302. As illustrated in FIG. 3, the fuel 304, when purging, flows through the fuel filter 310 and/or the screen filter 308 in the direction that the fuel 304 normally flows through the fuel delivery system 300. However, to purge the fuel 304 that is on the outlet side of the fuel filter 310 between the fuel filter 310 and the fuel shutoff valve 312, for example, the fuel delivery system 300 further includes a bypass valve 334. The bypass valve 334 is opened and shut by the controller 316 using a bypass signal 336. The bypass valve 334 is used to provide the pressure from the nitrogen 326 to the outlet 313 of the fuel filter 310 and/or an outlet 344 of the screen filter 308 to allow the fuel 304 to be purged through both an inlet 337 of the fuel filter 110 and the outlet 313 of the fuel filter 310, as well as an inlet 346 and the outlet 344 of the screen filter 308, providing for bidirectional purging through at least two components of the fuel delivery system 300.

Figure 4:
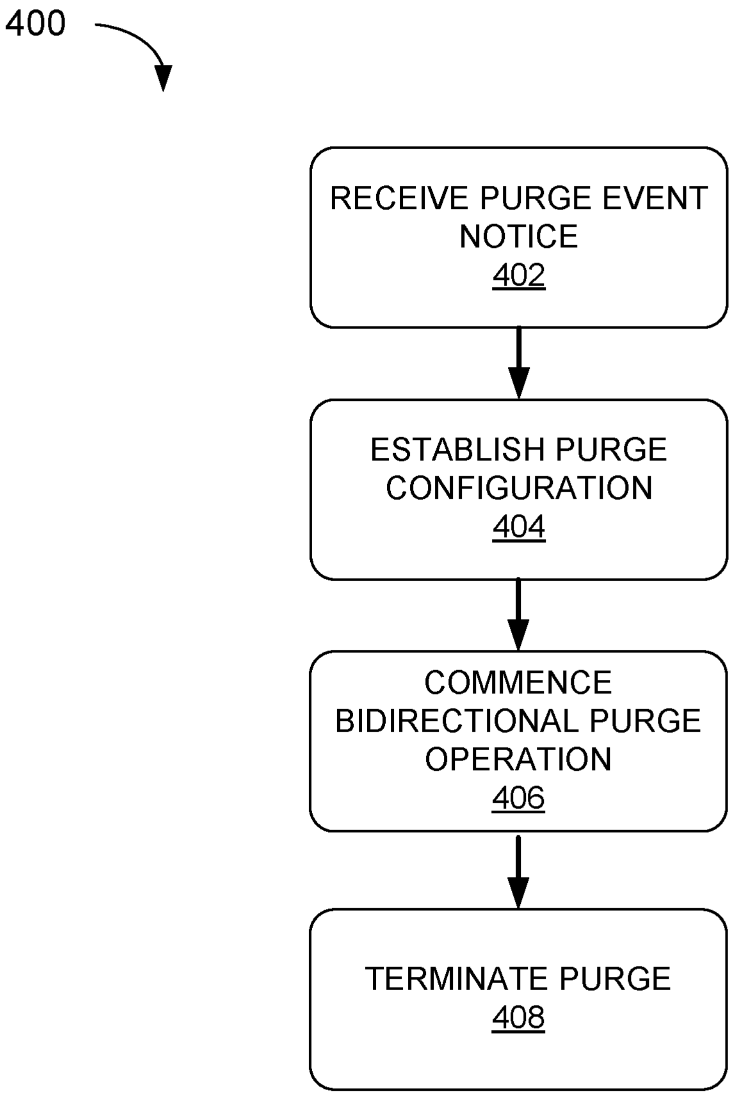
FIG. 4 illustrates a method for operating a fuel delivery system that uses bidirectional purging, in accordance with various examples of the presently disclosed subject matter.

FIG. 4 illustrates a method 400 for operating a fuel delivery system that uses bidirectional purging, in accordance with various examples of the presently disclosed subject matter. The method 400 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The method 400 commences at step 402, where the controller 116 receives a purge event notice 132. The purge event notice 132 may be received from various sources, including the fuel delivery system 100. For example, the engine to which the fuel delivery system 200 supplies the fuel 104 may be turning off or shutting down. The controller 116 may receive the purge event notice 132 from an ECU associated with the engine. The presently disclosed subject matter is not limited to any particular source of the purge event notice 132.

At step 404, the controller 116 establishes a purge configuration of the fuel delivery system 100. When the controller 116 receives the purge event notice 132, the controller 116 issues the pump control signal 120 to the fuel pump 106 to turn off the fuel pump 106, thereby reducing or stopping the uptake of the fuel 104 from the fuel tank 102 by the fuel pump 106. The controller 116 further issues the fuel shutoff signal 118 to the fuel shutoff valve 112, issues the purge signal 130 to open the purge fluid valve 128, and issues the purge signal 124 to open the purge valve 122. Further, the controller 116 further issues the bypass signal 136 to open the bypass valve 134. With the bypass valve 134 open, the fuel 104 flows into the fuel filter 110 through the outlet 113 and inlet 137 of the fuel filter 110, thereby providing bidirectional purging.

At step 406, the directional purge operation commences. The pressurized nitrogen 126 is allowed to flow into the fuel delivery system 100 to force the fuel 104 out through the fuel filter 110.

At step 408, the controller 116 terminates the purge. The controller 116 issues the purge signal 130 to close the purge fluid valve 128 and issues the purge signal 124 to close the purge valve 122. Further, the controller 116 further issues the bypass signal 136 to close the bypass valve 134.

Figure 5:
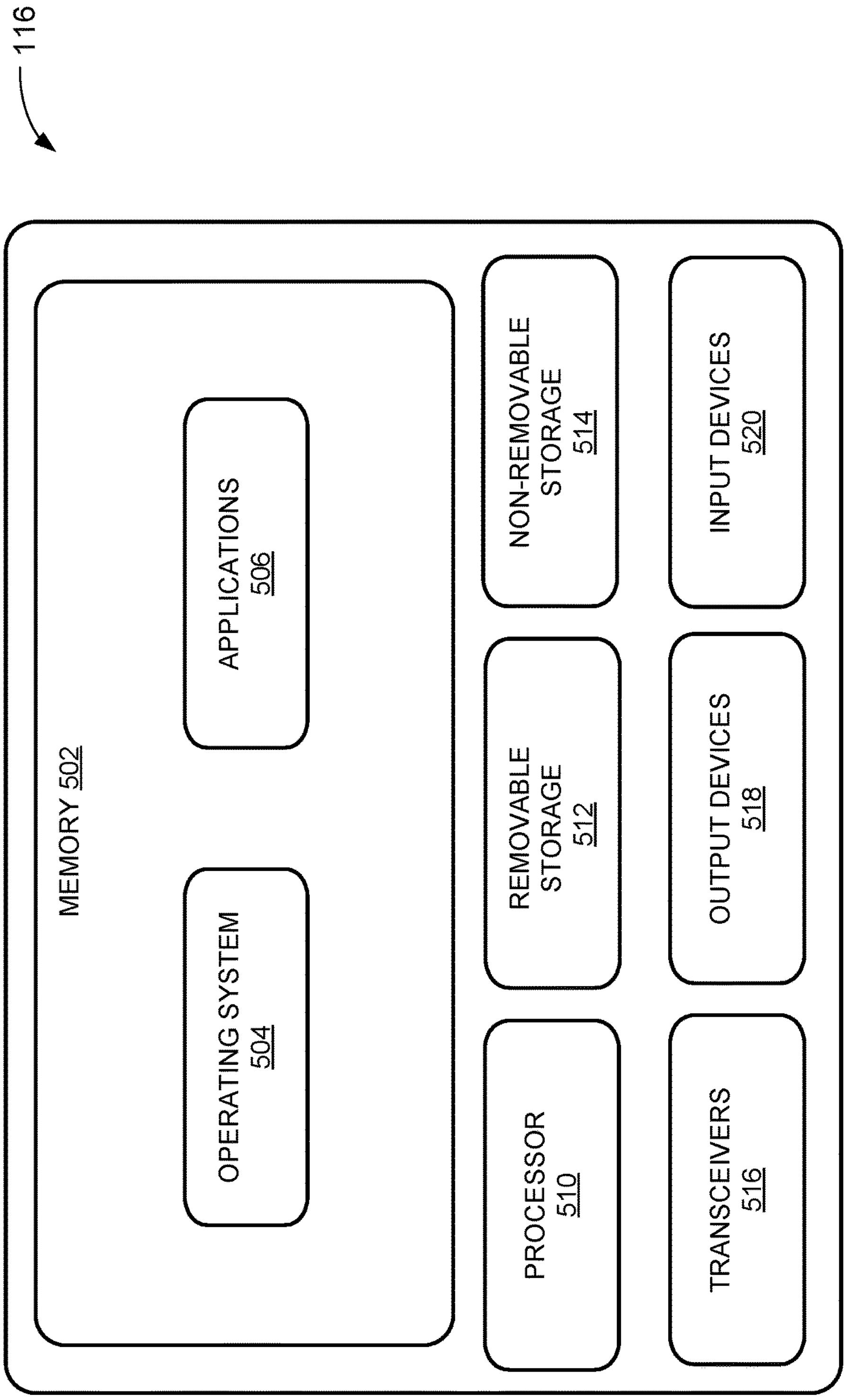
FIG. 5 depicts a component level view of a controller for use with the systems and methods described herein, in accordance with various examples of the presently disclosed subject matter.

FIG. 5 depicts a component level view of the controller 116 for use with the systems and methods described herein, in accordance with various examples of the presently disclosed subject matter. The controller 116 could be any device capable of providing the functionality associated with the systems and methods described herein. The controller 116 can comprise several components to execute the above-mentioned functions. The controller 116 may be comprised of hardware, software, or various combinations thereof. As discussed below, the controller 116 can comprise memory 502 including an operating system (OS) 504 and one or more standard applications 506. The standard applications 506 may include applications that provide for receiving the purge event notice 132 and issuing one or more signals to open and close various valves associated with the fuel delivery system 100.

The controller 116 can also comprise one or more processors 510 and one or more of removable storage 512, non-removable storage 514, transceiver(s) 516, output device(s) 518, and input device(s) 520. In various implementations, the memory 502 can be volatile (such as random-access memory (RAM)), non-volatile (such as read only memory (ROM), flash memory, etc.), or some combination of the two. The memory 502 can include data stored on a remote server or a cloud of servers accessible by the controller 116.

The memory 502 can also include the OS 504. The OS 504 varies depending on the manufacturer of the controller 116. The OS 504 contains the modules and software that support basic functions of the controller 116, such as scheduling tasks, executing applications, and controlling peripherals. The OS 504 can also enable the controller 116 to send and retrieve other data and perform other functions, such as transmitting control signals using the transceivers 516 and/or output devices 518 and receiving signals using the input devices 520.

The controller 116 can also comprise one or more processors 510. In some implementations, the processor(s) 510 can be one or more central processing units (CPUs), graphics processing units (GPUs), both CPU and GPU, or any other combinations and numbers of processing units. The controller 116 may also include additional data storage devices (removable and/or non-removable) such as, for example, magnetic disks, optical disks, or tape. Such additional storage is illustrated in FIG. 5 by removable storage 512 and non-removable storage 514.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the controller 116. Any such non-transitory computer-readable media may be part of the controller 116 or may be a separate database, databank, remote server, or cloud-based server.

In some implementations, the transceiver(s) 516 include any transceivers known in the art. In some examples, the transceiver(s) 516 can include wireless modem(s) to facilitate wireless connectivity with other components (e.g., between the controller 116 and a wireless modem that is a gateway to the Internet), the Internet, and/or an intranet. Specifically, the transceiver(s) 516 can include one or more transceivers that can enable the controller 116 to send and receive data. Thus, the transceiver(s) 516 can include multiple single-channel transceivers or a multi-frequency, multi-channel transceiver to enable the controller 116 to send and receive video calls, audio calls, messaging, etc. The transceiver(s) 516 can enable the controller 116 to connect to multiple networks including, but not limited to 2G, 3G, 4G, 5G, and Wi-Fi networks. The transceiver(s) 516 can also include one or more transceivers to enable the controller 116 to connect to future (e.g., 6G) networks, Internet-of-Things (IoT), machine-to machine (M2M), and other current and future networks.

The transceiver(s) 516 may also include one or more radio transceivers that perform the function of transmitting and receiving radio frequency communications via an antenna (e.g., Wi-Fi or Bluetooth®). In other examples, the transceiver(s) 516 may include wired communication components, such as a wired modem or Ethernet port, for communicating via one or more wired networks. The transceiver(s) 516 can enable the controller 116 to facilitate audio and video calls, download files, access web applications, and provide other communications associated with the systems and methods, described above.

In some implementations, the output device(s) 518 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 518 can also include speakers, or similar devices, to play sounds or ringtones when an audio call or video call is received. Output device(s) 518 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the standard applications 506, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 520 and an output device 518.

INDUSTRIAL APPLICABILITY

The present disclosure relates generally to purging a fuel from a fuel delivery system of an internal combustion engine, primarily diesel fuel engines that use a fuel such as methanol as a substitute fuel for all or a portion of the diesel fuel. In various uses, it may be required or desired to remove at least a portion of a fuel from parts of an engine for various reasons. For example, the fuel may be corrosive, whereby allowing the fuel to remain in contact with various parts of an engine may degrade the engine parts. In another example, the fuel may be a safety hazard that, if left within the engine or the fuel delivery system of the engine, can endanger personal using the engine. In engines that a purge operation is to be used, one or more components of the engine are used as drains to allow the fuel to be purged. The system is configured to allow for bidirectional purging through one or more components of the fuel delivery system. Bidirectional purging provides for moving the fuel to be purged into a component in more than one fluid flow direction. Thus, in some examples, bidirectional purging allows for a greater volume of the fluid to be purged than unidirectional purging. For example, in FIG. 1, the fuel 104 can be purged into both the inlet 137 of the fuel filter 110 and the outlet 113 of the fuel filter 110.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A fuel delivery system, the system comprising:
- a fuel pump fluidly connected to a fuel tank, the fuel pump configured to direct a fuel from the fuel tank to be used by an internal combustion engine;
- a bidirectional purge component fluidly connected to the fuel pump, the bidirectional purge component comprising:
  - an inlet configured to receive the fuel from the fuel pump;
  - an outlet configured to:
    - direct the fuel out of the bidirectional purge component to the internal combustion engine during a fuel delivery operation; and
    - receive the fuel into the bidirectional purge component during a purge operation; and
  - a purge outlet fluidically connected to a tank, the purge outlet configured to direct the fuel entering the inlet or outlet during the purge operation to the tank; and
- a pressure regulator fluidically connected to the outlet of the bidirectional purge component, the pressure regulator configured to maintain a pressure of the fuel below a predetermined pressure; and
- a differential pressure source fluidically connected to the bidirectional purge component, the differential pressure source providing a differential pressure across the bidirectional purge component to cause the fuel to move into the inlet of the bidirectional purge component or the outlet of the bidirectional purge component during the purge operation.

2. The fuel delivery system of claim 1, wherein the differential pressure source comprises pressurized fluid fluidically connectable to the fuel delivery system by opening a purge fluid valve and fluidically disconnectable from the fuel delivery system by closing the purge fluid valve.

3. The fuel delivery system of claim 2, further comprising a bypass valve to bypass the pressure regulator, allowing the pressurized fluid to force fuel into the outlet of the bidirectional purge component.

4. The fuel delivery system of claim 3, further comprising a purge cutoff valve configured to fluidically disconnect the pressurized fluid from the inlet of the bidirectional purge component, wherein when the purge fluid valve is open and wherein:

when the purge cutoff valve is open and the bypass valve is shut, the pressurized fluid forces the fuel into the inlet of the bidirectional purge component;

when the purge cutoff valve is closed and the bypass valve is open, the pressurized fluid forces the fuel into the outlet of the bidirectional purge component; and when the purge cutoff valve is open and the bypass valve is open, the pressurized fluid forces the fuel into the inlet and the outlet of the bidirectional purge component simultaneously.

5. The fuel delivery system of claim 2, wherein the pressurized fluid comprises nitrogen.

6. The fuel delivery system of claim 1, further comprising a fuel shutoff valve to fluidically connect the outlet of the bidirectional purge component to the internal combustion engine during the fuel delivery operation and fluidically disconnect the outlet of the bidirectional purge component from the internal combustion engine during the purge operation.

7. The fuel delivery system of claim 1, wherein the bidirectional purge component comprises a fuel filter configured to filter a portion of particles from the fuel prior to the fuel entering the internal combustion engine.

8. The fuel delivery system of claim 1, further comprising a second bidirectional purge component, the second bidirectional purge component comprising:

a second inlet configured to receive the fuel from the fuel pump; and a second outlet configured to:

direct the fuel out of the second bidirectional purge component during a fuel delivery operation; and receive the fuel into the second bidirectional purge component during a purge operation.

9. The fuel delivery system of claim 1, wherein the differential pressure source comprises a purge pump fluidically connected to the purge outlet, the purge pump configured to direct the fuel from the purge outlet to the tank.

10. The fuel delivery system of claim 1, wherein the tank is the fuel tank.

11. The fuel delivery system of claim 1, wherein the tank comprises a second fuel tank.

12. A controller for controlling a purge operation of a fuel delivery system, the controller comprising:

a memory storing computer-executable instructions; and a processor in communication with the memory, the computer-executable instructions causing the processor to perform acts comprising:

receiving a purge event notice to purge a fuel from at least a portion of a fuel delivery system of an internal combustion engine;

establishing a purge configuration to commence a bidirectional purge operation of the fuel through a bidirectional purge component, wherein the bidirectional purge component comprises:

an inlet configured to receive the fuel from a fuel pump; and an outlet configured to:

direct the fuel out of the bidirectional purge component to the internal combustion engine during a fuel delivery operation; and receive the fuel into the bidirectional purge component during a purge operation; and a purge outlet fluidically connected to a tank, the purge outlet configured to direct the fuel entering the inlet or entering the outlet during the purge operation to the tank; and terminating the purge operation.

13. The controller of claim 12, wherein the computer-executable instructions to cause the processor to perform the act comprising establishing the purge configuration comprises computer-executable instruction to cause the processor to perform the acts comprising:

closing a fuel shutoff valve to fluidically disconnect the outlet of the bidirectional purge component from the internal combustion engine during the purge operation;

turning off the fuel pump;

opening a purge fluid valve to fluidically connect a pressurized fluid to the inlet of the bidirectional purge component;

opening a bypass valve to bypass a regulator to fluidically connect the pressurized fluid to the outlet of the bidirectional purge component; and opening a purge valve to fluidically connect the purge outlet of the bidirectional purge component to the tank to provide for the purge operation.

14. The controller of claim 13, wherein the pressurized fluid comprises nitrogen.

15. The controller of claim 13, wherein the computer-executable instructions to cause the processor to perform the act comprising terminating the purge operation comprises computer-executable instruction to cause the processor to perform the acts comprising:

closing the purge fluid valve;

closing the bypass valve; and closing the purge valve.

16. The controller of claim 12, wherein the computer-executable instructions to cause the processor to perform the act comprising establishing the purge configuration comprises computer-executable instruction to cause the processor to perform the acts comprising:

closing a fuel shutoff valve to fluidically disconnect the outlet of the bidirectional purge component from the internal combustion engine during the purge operation;

turning off the fuel pump;

turning on a purge pump, the purge pump fluidically connected to a purge valve of the bidirectional purge component, the purge pump configured to pump fuel from the purge valve to the tank; and opening the purge valve to fluidically connect the bidirectional purge component to the purge pump to provide for the purge operation.

17. The controller of claim 12, wherein the fuel comprises methanol or ethanol.

18. The controller of claim 12, wherein the bidirectional purge component comprises a fuel filter configured to filter a portion of particles from the fuel prior to the fuel entering the internal combustion engine.

19. A method of bidirectional purging, the method comprising:

receiving a purge event notice to purge a fuel from at least a portion of a fuel delivery system of an internal combustion engine;

establishing a purge configuration to commence a bidirectional purge operation of the fuel through a bidirectional purge component, wherein the bidirectional purge component comprises:

an inlet configured to receive the fuel from a fuel pump; and an outlet configured to:
direct the fuel out of the bidirectional purge component to the internal combustion engine during a fuel delivery operation; and
receive the fuel into the bidirectional purge component during a purge operation; and
a purge outlet fluidically connected to a tank, the purge outlet configured to direct the fuel entering the inlet or entering the outlet during the purge operation to the tank; and
terminating the purge operation.

20. The method of claim 19, wherein establishing the purge configuration comprises:
closing a fuel shutoff valve to fluidically disconnect the outlet of the bidirectional purge component from the internal combustion engine during the purge operation;
turning off the fuel pump;
opening a purge fluid valve to fluidically connect a pressurized fluid to the inlet of the bidirectional purge component;
opening a bypass valve to bypass a regulator to fluidically connect the pressurized fluid to the outlet of the bidirectional purge component; and
opening a purge valve to fluidically connect the purge outlet of the bidirectional purge component to the tank to provide for the purge operation.

* * * * *